April 15, 1930. E. G. BUSSE ET AL 1,754,385
SUPPLEMENTAL SUPPORT FOR BRAKE BEAMS
Filed July 11, 1927   2 Sheets-Sheet 1
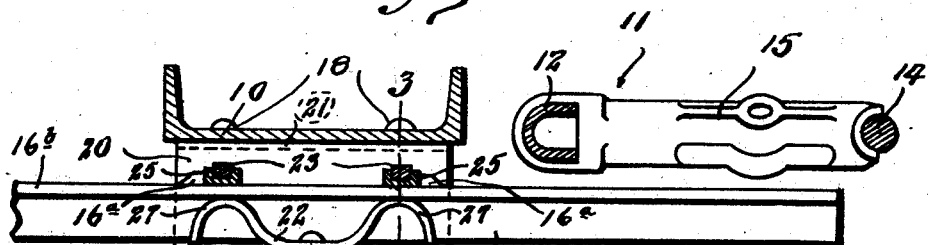
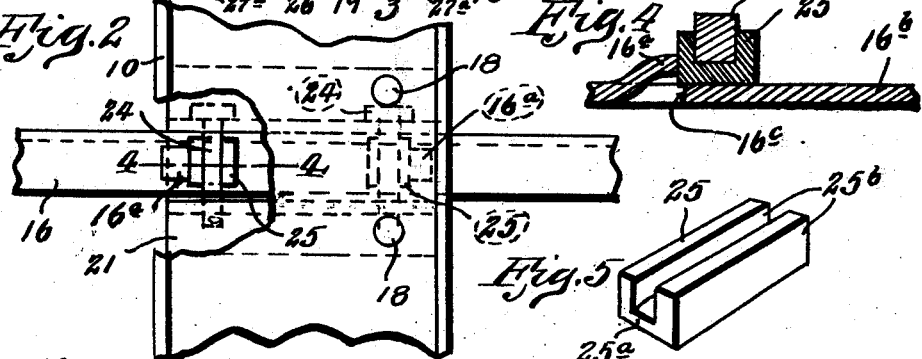
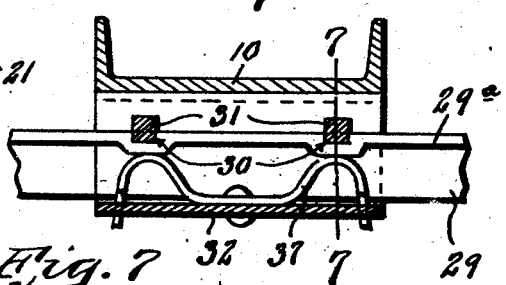
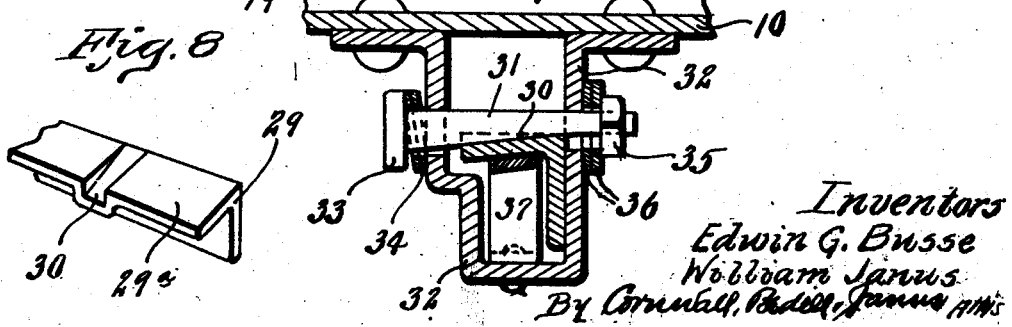
Inventors
Edwin G. Busse
William Janus

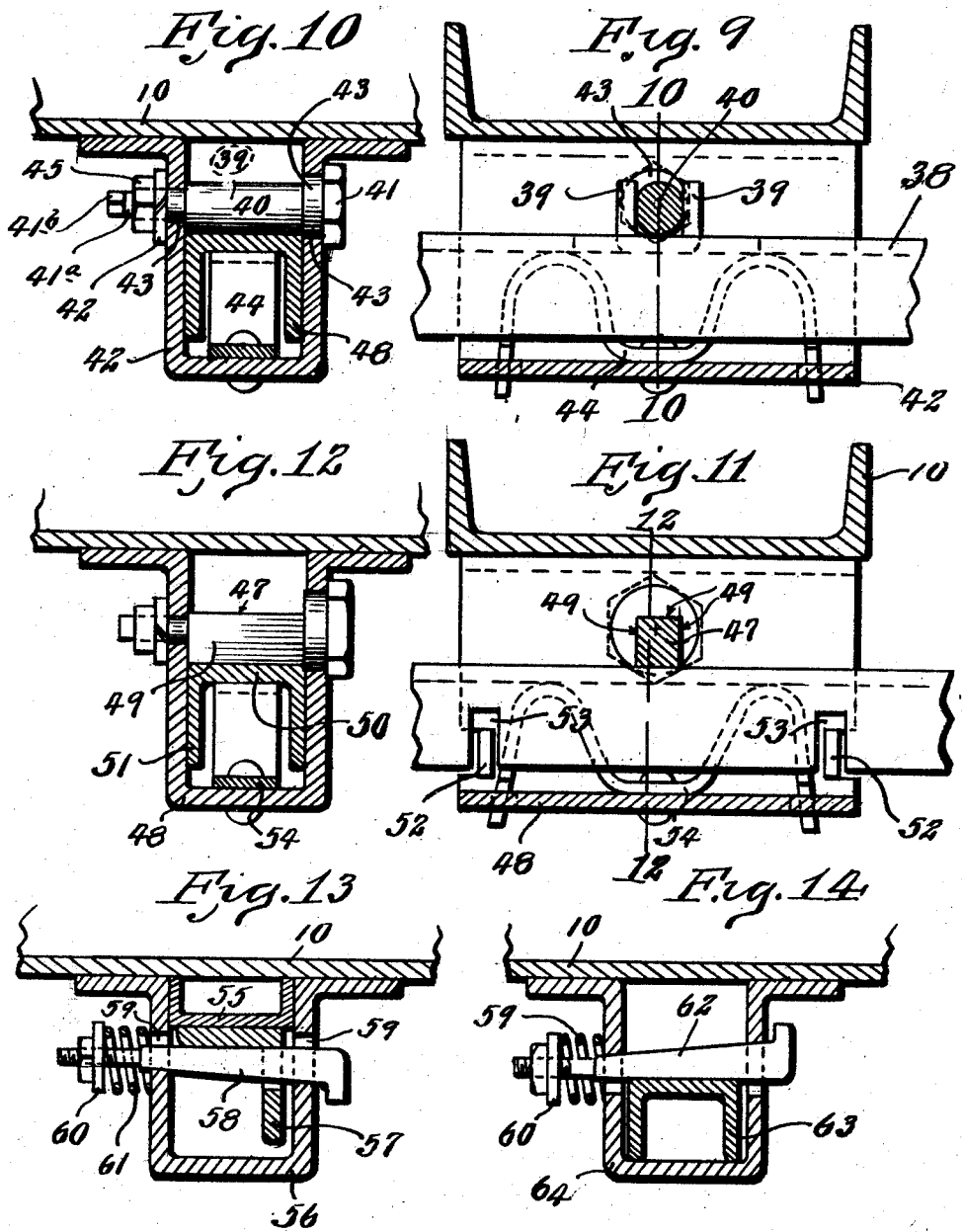

Patented Apr. 15, 1930

1,754,385

UNITED STATES PATENT OFFICE

EDWIN G. BUSSE, OF CHICAGO, ILLINOIS, AND WILLIAM JANUS, OF WEBSTER GROVES, MISSOURI, ASSIGNORS TO CHICAGO RAILWAY EQUIPMENT COMPANY, OF CHICAGO, ILLINOIS, A CORPORATION OF ILLINOIS

SUPPLEMENTAL SUPPORT FOR BRAKE BEAMS

Application filed July 11, 1927. Serial No. 204,908.

This invention relates to new and useful improvements in supplemental supports for brake beams and has for its object the provision of simple and efficient means for maintaining the support bar in position on the car truck part.

Other objects of the invention are to provide means mounted in the carrying bracket and adjustable relatively to the safety bar to cause the latter to be held securely in position therein, thereby eliminating lost motion and vibration of said bar.

Further objects of the invention are to provide a safety bar having formed thereon vertically and transversely disposed shoulders adapted to be engaged by the transverse member of the bracket for locking said bar against longitudinal movement.

Still other objects of the invention are to provide a member adapted to be disposed transversely in the bracket for engaging the safety bar, said member being provided with a plurality of faces or bearing points spaced various distances from the axis of said member and adapted to bear on the safety bar whereby the latter may be adjusted to different levels by means of said transverse member.

With these and other objects in view our invention consists in certain novel features of construction and arrangement of parts, hereinafter more fully described and claimed, and illustrated in the accompanying drawings in which—

Figure 1 is a side elevational view of a safety bar partly broken away and supported in operating position.

Figure 2 is a fragmental top plan view of the parts shown in Figure 1.

Figure 3 is a transverse vertical section taken on line 3—3 of Figure 1.

Figure 4 is an enlarged detail cross section taken on line 4—4 of Figure 2.

Figure 5 is a perspective detail view of one of the shims or spacers used in the form shown in Figures 1 to 4.

Figure 6 is a view similar to Figure 1 but showing a modified form of the safety bar seat and the transverse locking member.

Figure 7 is a cross section taken on line 7—7 of Figure 6.

Figure 8 is a perspective detail view of a portion of the safety bar showing the seat formed therein.

Figure 9 is a longitudinal cross section through the support bracket showing the modified form of transverse member for locking the safety bar.

Figure 10 is a section taken on line 10—10 of Figure 9.

Figure 11 is a longitudinal cross section through the bracket showing another modified form of locking the safety bar therein.

Figure 12 is a cross section taken on line 12—12 of Figure 11.

Figure 13 is a transverse cross section through the bracket and the safety bar and showing a tapered locking member bearing against the safety bar for locking the same in position.

Figure 14 is a similar view but showing the tapered locking member bearing on top of the safety bar and locking it against the bottom of the bracket.

Referring by numerals to the accompanying drawings, 10 indicates a spring plank of a car truck and 11 indicates a trussed brake beam comprising a compression member 12, a tension member 14 and a strut 15.

Underlying the brake beam is one end of a safety bar 16 which is carried by a mounting or bracket 17. The latter is secured to the underside of spring plank 10 in any suitable manner such as fastening devices 18. Bracket 17 is preferably formed U-shape in cross section having a horizontal bottom wall 19, vertical walls 20 and attaching flanges 21, which latter extend horizontally from the upper ends of walls 20 and are secured to the spring plank 10 by devices 18. A leaf spring 22 is preferably interposed between bottom wall 19 and the underside of safety bar 16 and is so shaped as to resiliently support said bar and hold it under pressure against locking members 23.

In the form shown in Figures 1 to 5 these members 23 consist of bolts 24 which are seated in apertures formed in side walls 20 and extend transversely of safety bar 16. In order to allow adjustment of the safety bar 16 to different horizontal planes, without necessitating the changing of position of bolts 24. U-shaped shims or spacers 25 are provided and are adapted to be interposed between each bolt 24 and the top of bar 16. The thickness of the bottom wall 25ª of each spacer may be varied to provide the necessary rise or depression of the safety bar. The side walls 25ᵇ extend upwardly a suitable distance and are adapted to engage on one side a vertically disposed shoulder 16ª transversely formed on and projecting above the top of the safety bar 16 so that said bar is prevented from moving in longitudinal direction by the interengagement of shoulders 16ª with the side walls 25ᵇ of the corresponding spacers.

In the present instance shoulders 16ª are formed by cutting the horizontal flange 16ᵇ of bar 16 transversely for a short distance as indicated at 16ᶜ and pressing said cut portion outwardly and upwardly above the flange 16ᵇ so as to dispose the edge of said pressed portion vertically to form shoulder 16ª. The spring 22 is disposed longitudinally in bracket 17 and is preferably secured to the bottom wall thereof as indicated at 26 in Figure 1. The terminal portions of said spring are bent upwardly and then downwardly to from loops 27 adapted to bear against the underside of flange 16ᵇ and the ends of said portions are deflected downwardly and are preferably reduced as indicated at 27 and pass through apertures formed in bracket 17 thereby retaining said looped portions 27 in tensioned position. Each bolt 24 is preferably locked against withdrawal by a cotter pin 28.

Thus the safety bar 16 is held by the tension of spring 22 against spacers 25 and bolts 24 thereby eliminating vibration and rattling of the parts and the tension of said spring may be increased by substituting spacers 25 having bottom walls 25ª of greater thickness.

In the form shown in Figures 6 to 8 a safety bar 29, which in the present instance is in the shape of an angle iron, is formed in its horizontally disposed flange 29ª with a transverse seat 30 which is inclined from horizontal having its greatest depth at the edge of said flange 29ª. A key 31 is seated in the vertical walls of a bracket 32 and has its lower edge disposed at an angle corresponding to the angle of seat 30 so that when said key member is in position it engages said seat. Key member 31 is provided at one end with a head 33 and interposed between it and the corresponding side wall of bracket 32 is resilient means such as spring washers 34. The opposite end of member 31 is threaded and receives a nut 35. Thus, by turning the nut in proper direction, member 31 can be moved longitudinally to position the inclined face thereof relatively to the seat 30 of member 29, thereby permitting raising or lowering of said safety bar. A series of spacers 36 are arranged between nut 35 and the corresponding side wall of bracket 32 and said spacing washers may be removed as the key member is taken up. A leaf spring 37 is interposed between the bottom wall of bracket 32 and the flange 29ª of bar 29 and serves to hold the latter against member 31. By virtue of the interengagement of member 31 with seat 30 said member not only serves as adjusting means for regulating the level of said safety bar, but also prevents the longitudinal displacement of same.

In the form shown in Figures 9 and 10, a safety bar 38, which in the present instance, is channel shaped in cross section, has its web portion formed with a pair of upwardly presented spaced ears 39 between which operates the eccentric portion 40 of an adjusting and locking member 41. These ears are preferably formed by cutting and bending upwardly portions of web 38ª.

Member 41 is revolubly seated in the side walls of a bracket 42, said member having formed in its shank coaxial round portions 43 having bearings in the side walls of bracket 42. The eccentric portion 40 is disposed between said round portions 43 and bears on top of bar 38 so that, as member 41 is rotated, said eccentric portion 40 causes lowering or raising of said safety bar. A leaf spring 44 similar in shape to the spring shown in the previous forms maintains said bar 38 against the eccentric portion 40. The adjusting member 41 is locked in adjusted position by a nut 45 which is screwed on the threaded reduced end 41ª of member 41. The extremity of this reduced end is preferably non-circular in cross section as indicated at 41ᵇ, in order to provide suitable means for turning said adjusting member. A spring washer 46 is preferably interposed between nut 45 and the corresponding side wall bracket 42 in order to prevent accidental turning of adjusting member 41.

In the form just described, the bar engaging portion of the adjusting member is formed circular in cross section and is eccentrically disposed relatively to the axis of rotation of said adjusting member. In the modification shown in Figures 11 and 12, the adjusting member 47 is revolubly mounted in bracket 48 and has its bar engaging portion formed polygonal in cross section, to provide a plurality of peripheral flat faces 49, each of which is disposed from the axis of rotation of said adjusting member 47 a distance differential with respect to the distances of the other faces. Thus by turning the adjusting member 47 in proper direction the corresponding face portion 49 is brought in engagement with the web portion 50 of safety bar 51 and the latter is held at proper level. The side walls of bracket 48 are provided with laterally and inwardly extending lugs or projections 52 which cooperate with notches 53 formed in the vertically disposed flanges of bar 51. In this manner said bar is held against longitudinal movement but is free to move in vertical plane and maintain its engagement with adjusting member 47. A leaf spring 54 bent to proper shape yieldingly holds bars 51 against adjusting member 47.

In the modified form shown in Figure 13 a spacer 55 is arranged between the side walls of bracket 56 and serves to space safety bar 57 suitable distance from the spring plank 10. This bar is rigidly held against the underside of the horizontal portion of said bar. The lower edge of key 58 is inclined from the horizontal and bears against the lower end of openings 59 and the side walls of the bracket 56. One end of the key is enlarged to lock said key against movement in one direction and the opposite end of said key has secured thereon a washer 60 which is spaced a suitable distance from the corresponding wall of bracket 56 and is engaged by one end of a coiled spring 61, the opposite end of which bears against said side wall and serves to hold key 58 against the horizontal portion of bar 59.

The modification shown in Figure 14 is similar to the form shown in Figure 13 with the exception that the key member 62 occupies reverse position with respect to key member 58 and a safety bar 63 is disposed below the key and locked against the bottom wall of a bracket 64.

We claim:

1. A supplemental support for brake beams comprising in combination with a truck part, a bracket secured thereto, a resilient element in said bracket, a safety bar arranged in said bracket on said element and extending underneath the brake beam and a member arranged transversely in said bracket and engaging a seat formed in the top of said safety bar for locking the latter against displacement.

2. A supplemental support for brake beams comprising in combination with a truck part, a bracket secured thereto, a rigid safety bar arranged in said bracket and extending underneath the brake beam, a yielding support for said bar, and a member arranged transversely in said bracket and engaging a seat formed in top of said safety bar, said member being adjustable relatively to said safety bar for adjusting the height of latter.

3. A supplemental support for brake beams comprising in combination with a truck part, a bracket secured thereto, a safety bar arranged in said bracket and extending underneath the brake beam and a member arranged transversely in said bracket and engaging a seat formed in top of said safety bar, said seat and said member being provided with cooperating surfaces and said member being adjustable relatively to said safety bar for adjusting the latter in a vertical plane, and resilient means for maintaining said adjusting member and said safety bar in yielding cooperative engagement.

4. A supplemental support for brake beams comprising in combination with a truck part, a bracket secured thereto, a safety bar arranged in said bracket and extending underneath the brake beam, a resilient member arranged in said bracket and bearing against the underside of said safety bar and a member arranged transversely in said bracket and engaging said safety bar for locking the latter in position, said member being adjustable to regulate the elevation of said safety bar.

5. A supplemental support for brake beams comprising in combination with a truck part, a bracket scecured thereto, a safety bar arranged in said bracket and extending underneath the brake beam, a resilient member arranged in said bracket and bearing against the underside of said safety bar, a member arranged transversely in said bracket and bearing against the top of said safety bar for locking the latter in position, said member being adjustable to regulate the elevation of said safety bar, and means cooperating with said transverse member for insuring interengagement thereof with said safety bar.

6. A supplemental support for brake beams comprising a truck part, a U-shaped bracket secured thereto, a safety bar arranged in said bracket and extending underneath a brake beam and an adjustable member arranged transversely in said bracket and bearing against said safety bar for locking the latter against displacement, said member having a plurality of bar engaging points adapted to be disposed at different levels for adjusting said safety bar to different horizontal planes.

7. A supplemental support for brake beams comprising a truck part, a U-shaped bracket secured thereto, a safety bar arranged in said bracket and extending underneath a brake beam, an adjustable member arranged transversely in said bracket and bearing on top of said safety bar for locking the latter against displacement, said member having a plurality of bar engaging points adapted to be disposed at different levels for adjusting said safety bar to different horizontal planes, and a leaf spring arranged in said bracket and bearing against the underside of said safety bar for yieldingly maintaining the latter in engagement with said adjusting member.

8. A supplemental support for brake beams comprising in combination a truck part, a U-shaped bracket secured thereto, a safety bar removably arranged in said bracket and extending underneath a brake beam, an adjusting member arranged transversely in said bracket and having a plurality of bar engaging surfaces adapted to be arranged at different horizontal planes whereby said safety bar may be correspondingly raised or lowered and a leaf spring secured to the bottom wall of said bracket and having portions bearing against the underside of said safety bar for yieldingly maintaining the latter against said adjusting member.

9. A supplemental support for brake beams comprising a truck part, a bracket secured thereto, a yielding element in said bracket, a rigid safety bar removably disposed on said element and in said bracket and extending underneath a brake beam and an adjusting member revolubly and transversely arranged in said bracket above said bar and having a plurality of bar engaging faces disposed eccentrically to the axis of rotation of said adjusting member to bring different faces into engagement with said bar and cause a corresponding change in the elevation thereof.

10. A supplemental support for brake beams comprising a truck part, a bracket secured thereto, a safety bar removably disposed in said bracket and extending underneath a brake beam and an adjusting member transversely and movably mounted in said bracket and provided with a plurality of bar engaging faces disposed at various distances from its bracket engaging parts whereby said safety bar can be adjusted vertically by the movement of said adjusting member and a yielding element in said bracket holding said safety bar against said adjusting member so that said safety bar will not vibrate in said bracket.

11. A supplemental support for brake beams comprising a truck part, a bracket secured thereto, a safety bar removably disposed in said bracket and extending underneath a brake beam, an adjusting member transversely and revolubly arranged in said bracket and provided with a plurality of bar engaging faces disposed at various distances from the axis of said adjusting member whereby said safety bar can be adjusted vertically by the partial rotation of said adjusting member, and vertically disposed shoulders formed integral with the top of said safety bar for engaging the sides of said transverse member and locking said bar against longitudinal movement.

12. A supplemental support for brake beams comprising in combination a car truck part, a U-shaped bracket carried thereby, a safety bar removably carried by said bracket and extending underneath a brake beam, a resilient means interposed between the bottom of said bracket and the underside of said bar for yieldingly supporting the same, and a locking member arranged transversely in said bracket and engaging a transverse seat formed in the top portion of said bar, said seat being formed by distorting portions of said bar to form spaced vertically and upwardly presented shoulders for engaging said locking member.

13. A supplemental support for brake beams comprising in combination a car truck part, a U-shaped bracket carried thereby, a safety bar removably carried by said bracket and extending underneath a brake beam, a resilient means interposed between the bottom of said bracket and the underside of said bar for yieldingly supporting the same, and a locking member arranged transversely in said bracket and engaging a transverse seat formed in the top portion of said bar, said seat being formed by distorting portions of said bar to form spaced vertically and upwardly presented shoulders for engaging said locking member, said locking member being adjustable to lower or raise said safety bar.

In testimony whereof we hereunto affix our signatures this 7th day of July, 1927.

EDWIN G. BUSSE.
WILLIAM JANUS.